3,232,727
SYNTHESIS GAS GENERATION
Frank E. Guptill, Jr., Fishkill, N.Y., and William L. Slater, La Habra, Calif., assignors to Texaco Inc., New York, N.Y., a corporation of Delaware
Filed Dec. 13, 1961, Ser. No. 158,969
3 Claims. (Cl. 48—215)

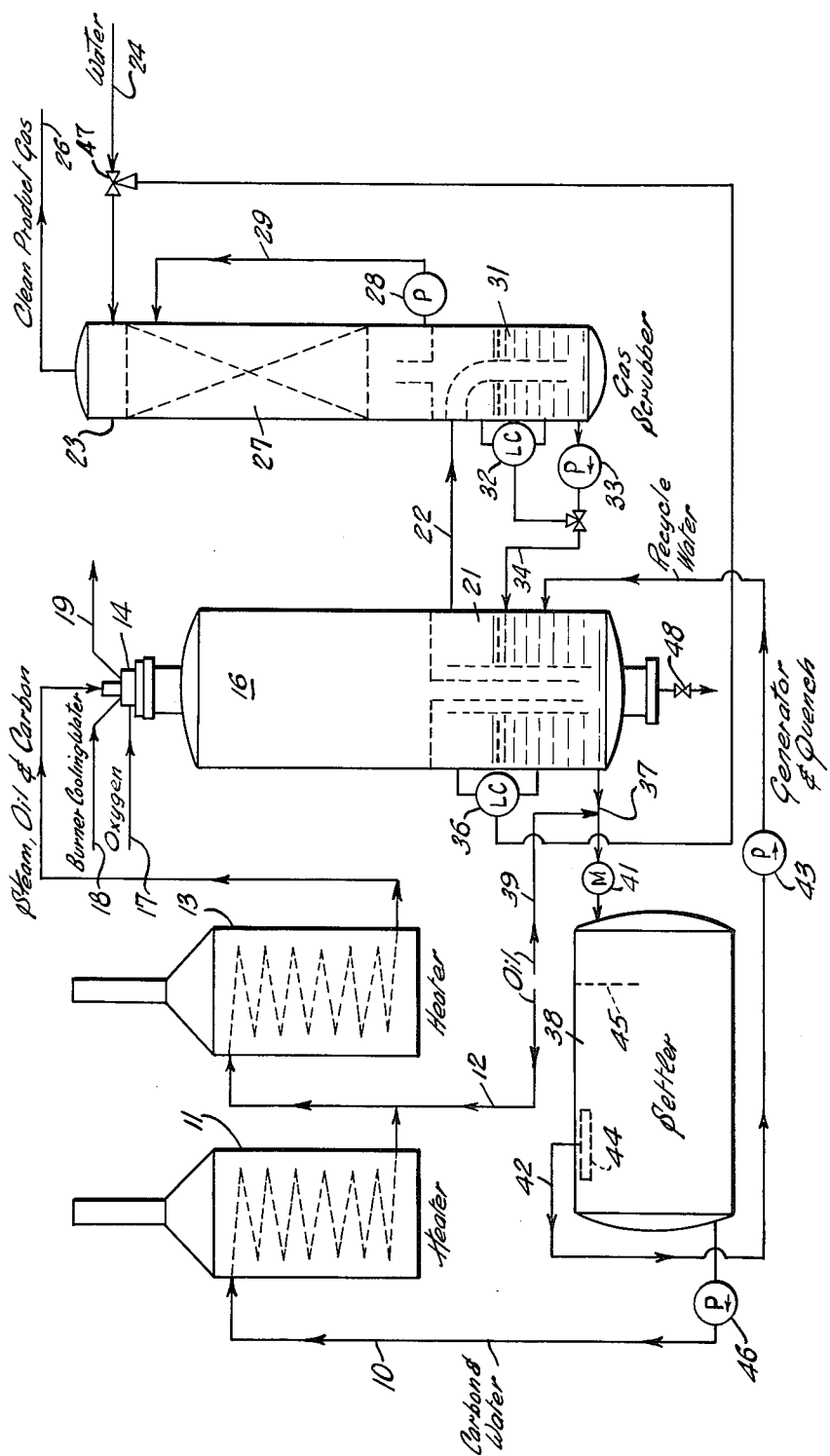

This invention relates to a process for the production of carbon monoxide and hydrogen, or synthesis gas, from liquid hydrocarbons by reaction with oxygen and steam. In one of its more specific aspects, it relates to a method of generating synthesis gas non-catalytically under carbon-forming conditions, recovering free carbon entrained in the gaseous products of reaction by scrubbing the gas with water to form a slurry of carbon in water, concentrating carbon in part of the wash water, and recycling the concentrate to the reaction zone.

In accordance with the present invention, hydrocarbon oil in an amount within the range of two-thirds to an amount equal to the oil absorption value of the carbon contained therein is added to the slurry of carbon in water obtained in the quench cooling and scrubbing of the hot product gases from the synthesis gas generator to form carbon curds dispersed in water and the mixture is passed to a tubular heater wherein water is vaporized to form a dispersion of carbon and oil in steam. This dispersion is supplied to the reaction zone together with oxygen and additional fuel oil for the production of synthesis gas. The oil may be substantially completely vaporized or only partly vaporized, depending upon the particular hydrocarbon or mixture of hydrocarbons employed, as will be evident from the detailed description hereinafter.

The generation of carbon monoxide and hydrogen, or synthesis gas, by partial oxidation of hydrocarbon oils forms a highly economical method of producing these gases in quantity. In the partial oxidation process, a liquid hydrocarbon is reacted with the oxygen and steam in a closed, compact reaction zone in the absence of catalyst or packing at an autogenous temperature within the range of about 1800 to 3500° F., preferably about 2200 to 2800° F. Preheating of the reactants is generally desirable; preferably the hydrocarbon oil and steam are preheated to a temperature of at least 600° F. Oxygen may be, but need not be, preheated. The reaction zone is maintained at a pressure above 100 pounds per square inch gauge and may be maintained at a pressure as high as about 2,000 pounds per square inch gauge. Steam is introduced into the reaction zone to assist in the dispersion of the fuel fed to the reactor, to assist in control of the reaction temperature, and as a reactant to increase the relative amount of hydrogen produced. The product gas stream consists principally of carbon monoxide and hydrogen and contains relatively small amounts of water vapor, carbon dioxide and entrained carbon. The solid carbon produced in the process is in very fine particle form and is easily wet by water.

The amount of uncombined oxygen supplied to the reaction zone is limited so that nearly maximum yields of carbon monoxide and hydrogen are obtained. Air, oxygen-enriched air, or substantially pure oxygen may be employed in the process. Oxygen of high purity may be readily obtained by liquefaction and rectification of air. Commercial oxygen plants capable of delivering large amounts of high purity oxygen produce oxygen streams containing in excess of 95 mol percent oxygen; oxygen of this purity is generally preferred in the process.

Product gases issuing from the gas generation reactor contain a large amount of heat. This may be employed to convert water to steam. If, for example, the synthesis gas from the gas generation step is to be passed to a process requiring additional steam as a reactant, for example, a water gas shift process, steam may be generated directly by contacting the effluent hot gas from the synthesis gas generator with water. In this case, part of the water is vaporized to produce additional steam, generally in an amount within the range of 0.5 to 1.0 mol per mol of synthesis gas. Where it is not desirable to add further amounts of water vapor to the synthesis gas stream, the heat may be recovered from the gas generator effluent by passing the hot gases through heat exchangers or waste heat boilers. Steam produced in waste heat boilers may be used advantageously as process steam or in the generation of power for plant use, for example, for the production of oxygen. Heat exchangers may be used for preheating feed streams to the synthesis gas generator. When the product gases are cooled by indirect heat exchangers, it is preferable to cool the gases to a temperature above the dew point of the gas at the prevailing pressure to avoid condensation of water with resultant corrosion of heat exchanger surfaces and adhesion of carbon thereto.

Entrained carbon in the gas stream is effectively removed from the product gases by contacting with water in gas-liquid contact apparatus, for example, spray towers, bubble plate contactors, or packed columns. Cooling of the synthesis gas may be effected also in the gas scrubbing operation by vaporizing part of the water employed in scrubbing the gas stream, by cooling the scrubbing water, or by a combination of vaporization and cooling.

It is desirable to maintain the solids content of the water in the scrubbing zone and in the quench water less than about 1 percent carbon by weight to maintain a fluid slurry or suspension which can be satisfactorily passed through lines for utilization and disposal of the carbon. Heretofore, it has been proposed that the carbon-containing water from the gas-liquid contacting zones be recycled to the synthesis gas generator as a source of steam and fuel for the process. The amount of steam which can be supplied to the gas generator for optimum operation generally is within the range of 0.5 to 1.0 pound per pound of fuel oil supplied thereto. To avoid excessive thickening or gelling of the carbon-water mixture, we have found that generally it is necessary to limit the carbon content of the water recycled to the preheater of the gas generation zone to not more than about 1 percent by weight. This severely restricts the amount of carbon which can be returned to the generator as a carbon-water slurry.

It has now been discovered that carbon concentrations of three to four or more weight percent may be carried in the water recycled to the preheaters of the synthesis gas generator, provided that a small amount of oil, less than the amount which can be absorbed by the carbon, is added to the carbon-water mixture. Thus we have effectively solved the problem of maintaining the carbon-water slurry in pumpable form with relatively high carbon concentrations by injecting hydrocarbon oil directly into the carbon-water slurry withdrawn from the gas-liquid contactor.

Generally it is desirable to operate the synthesis gas generator so that about 2 percent of the carbon content in the hydrocarbon supplied to the gas generator is liberated as free carbon entrained in the product gas. It is also desirable to supply about 0.5 to 0.9 pound of steam per pound of oil to the synthesis gas generator. The present invention makes it possible to maintain the quantity of unconverted carbon within the desired range and still recycle all of the carbon as a water dispersion to the synthesis gas generator.

Effective washing of the gas stream from the synthesis gas generator may require higher liquid rates than the amount of liquid required to suspend the separated carbon; therefore, it may be desirable to recycle a portion of the scrubbing water to the gas scrubber to provide a sufficient volume of liquid in the scrubber. The recycled stream of wash water is preferably drawn off at a point where the carbon concentration is well below the maximum concentration in the gas-liquid contacting system. The temperature of the dispersion withdrawn from the gas-liquid contacting system is advantageously maintained as high as practical to minimize preheating for the succeeding vaporization steps. The scrubbing temperature will not exceed the equilibrium vaporization temperature of water at the existing operating pressure. The equilibrium vaporization temperature will be somewhat below the boiling point of water at the existing pressure due to the fact that presence of hydrogen and carbon monoxide reduces the partial pressure of the water vapor so that vaporization of water takes place at a correspondingly low temperature. A substantial temperature differential may be maintained in the gas scrubbing zone by introducing cooled scrubbing water at the top of the scrubber so that the clean scrubbed gas is discharged at a relatively low temperature and with a correspondingly low water vapor content.

It is desirable to operate the scrubber at a high pressure, or substantially the pressure of the synthesis gas generator with allowance for pressure drop through the lines and other equipment. The use of high pressure makes possible relatively high temperatures in the scrubbing zone, minimizes the heat required to convert the dispersion of carbon curd in water to a dispersion of carbon and oil in steam, and delivers the product gas for subsequent use at high pressures with a minimum amount of compression.

Contact of the liquid hydrocarbon with the slurry of carbon in water may be effected with a mixing valve, pump, orifice, nozzle, propeller mixer or turbine mixer. It is preferred to contact the carbon in water slurry with the oil at the temperature and pressure of the gas-liquid contact zone. After mixing, the mixture is passed to a settling tank. High temperature facilitates phase separation by reducing oil viscosity. Sufficient volume is provided in the settling tank to afford a residence time of preferably at least two minutes. Clarified water is separated from the dispersion of oil weighted carbon curd in the separating zone. Clarified water from the phase separator or settling tank is returned to the scrubbing zone.

In accordance with the process of this invention, carbon contained in the scrubbing water and quench water is contacted with oil, preferably fuel oil supplied to the synthesis gas generator. Heavy fuel oil suitable for use in the process include, for example, heavy distillates, residual fuel oil, bunker fuel oil and No. 6 fuel oil. Advantageously the fuel oil is heated to a temperature approximately the temperature of the water in the quench zone or gas scrubbing zone prior to mixing the oil with the carbon in water slurry. The amount of oil added to the slurry is preferably an amount equivalent to about two-thirds the oil absorption value of the carbon contained in the slurry. Generally carbon produced in the synthesis gas generator has an oil absorption value of 2 to 4 milliliters per gram, or about 24 to 48 gallons per hundred pounds, of dry carbon. With carbon having an oil absorption value of 3 milliliters per gram, the preferred amount of oil added to the slurry prior to separation of clarified water in a settling tank is about 2 milliliters per gram, or 24 gallons per hundred pounds, of dry carbon contained in the quench water. It has been found that the addition of a limited amount of oil results in the formation of a relatively dry, non-sticky curd or floc which can be separated from part of the water while the remaining water containing the carbon curds can be pumped to the preheater and returned to the synthesis gas generator.

Oil absorptioin value is a measure of the amount of oil necessary to wet a particular sample of carbon. The oil absorption value is determined by adding small increments of oil to a sample of carbon, and mixing with a spatula between each addition until a single coherent ball of paste is formed which does not break down after forming. The procedure for this test is described in detail in ASTM Test D281-31. The standard test specifies alkali-refined linseed oil but the test is of value when used with other oils as well. The numerical oil absorption value represents the number of milliliters of oil added per gram of carbon. Oil absorption value may be expressed as milliliters per gram or may be converted to units of gallons per hundred pounds by applying a factor of 12.

When heavy fuel oils containing ash are used for the production of carbon monoxide and hydrogen, the ash from the fuel oil is liberated by the partial combustion reaction along with the liberated carbon and is combined with or absorbed on the particles of liberated carbon. When the carbon-containing ash, which usually comprises naturally-occurring heavy metal components, such as vanadium and nickel, is recycled to the synthesis gas generator the concentration of ash or incombustible residue tends to build up in the gas generator. It has been found, however, that the ash containing the heavy metals tends to accumulate in the water quench zone and, being heavier than the carbon, to settle to the bottom of the quench zone. A large part of the ash is easily removed from the quench zone wherein the gaseous products are cooled by direct contact with water and the ash is converted to a sand-like solid slag which settles to the bottom of the quench zone. The solid particles may be withdrawn through conventional lock hoppers not illustrated in the accompanying drawing.

An advantage of the process of this invention is that carbon produced in the generation of synthesis gas from liquid hydrocarbons is removed therefrom and utilized for the generation of carbon monoxide and hydrogen. Another advantage of the process of this invention is that carbon formed in the manufacture of synthesis gas is efficiently disposed of without the necessity for complex or expensive apparatus and without accumulation and accompanying storage problems. Still another advantage of this process is that heat contained in the gaseous product of the synthesis gas generator is effectively utilized.

Having set forth the general nature of the invention, a preferred mode of the operation is illustrated in the accompanying drawings and described in the following detailed description and specific example. Although the drawing illustrates a suitable arrangement of apparatus by which the process of this invention may be practiced, it is not intended to limit the invention to the particular apparatus or procedure described in detail hereafter.

With reference to the drawing, water containing carbon curds produced as described hereinafter, is passed through line 10 to tubular heater 11 wherein the water is vaporized to steam forming a dispersion comprising carbon in steam containing a small amount of oil. Fuel oil for the production of synthesis gas, supplied from line 12 is mixed with steam containing suspended carbon, from heater 11 and the mixture passed through tubular heater 13 wherein the oil is preheated and intimately dispersed in fine droplet form in steam. The resulting dispersion, preheated the extent desired, is introduced through burner 14 to a synthesis gas generator 16. Dispersion of fuel oil in steam is accomplished by passing the steam-oil mixture through tubular heater 13 and associated piping at a velocity in excess of about 20 feet per second, preferably above about 30 feet per second. Similarly, in tubular heater 11, the velocity in the steam section of the heater is maintained above 20 feet per second, preferably above 30 feet per second to effect dispersion of carbon in steam. The velocity of the water suspension of carbon curds supplied to heater 11 from line 10 is preferably maintained above about 0.5 foot per second, sufficient to develop the above defined velocities in the steam section of the heater.

Oxygen from line 17 is supplied to burner 14 of the gas generator where it is admixed with the steam-oil-carbon mixture supplied thereto from heater 13. The steam, oil, carbon and oxygen react in gas generator 16 at an autogenous temperature above 2200° F. e.g., at a preferred temperature of about 2800° F. and at an elevated pressure, e.g., about 300 pounds per square inch gauge, to produce synthesis gas comprising carbon monoxide and hydrogen. Additionally, the synthesis gas contains entrained carbon in the range of 0.5 to 5 percent, preferably about 2 percent, of the carbon content of the oil feed to the gas generator. Cooling water is supplied to the burner through line 18 and discharged through line 19 to prevent overheating of the burner. Hot synthesis gas from gas generator 16 is discharged into quench chamber 21 into direct intimate contact with water contained therein. A preferred form of quench apparatus is described in U.S. Patent 2,896,927 to Nagle and Eastman. Water in the quench zone effects quick cooling of the hot gas from generator, removal of a large proportion of the entrained carbon from the freshly generated synthesis gas, and the production of steam useful in subsequent operations, for example the water gas shift reaction. The cooled synthesis gas is passed through line 22 to scrubber 23 where it is further contacted and scrubbed in countercurrent flow with water introduced through line 24. Synthesis gas, free from entrained carbon and enriched in water vapor, is withdrawn through line 26 and is discharged for further use not illustrated in the drawing.

The scrubber 23 is preferably provided with a section 27 containing packing, baffles, bubble plates or the like, to insure intimate countercurrent gas-liquid contact therein. A stream of wash water is recycled to section 27 of the gas scrubber by means of pump 28 and line 29. The wash liquid, i.e., water containing suspended carbon removed from the gas stream, accumulates in the accumulator section 31 of the gas scrubbing tower. Gas from line 22 supplied to the gas scrubber is introduced into the scrubber below the surface of the water in accumulator section 31 of the gas scrubber. A liquid level controller 32 maintains a substantially constant level of accumulated wash liquid in the accumulator section 31 of the gas scrubber. Excess wash liquid from the gas scrubber is passed by pump 33 through line 34 to quench section 21 of the gas generator. The level of quench liquid, i.e., water containing carbon removed from the synthesis gas, is maintained substantially constant in quench section 21 of the synthesis gas generator by liquid level controller 36. A carbon-in-water slurry is withdrawn from quench zone 21 through line 37 into settling tank 38. Fuel oil from line 39 is injected into the carbon-in-water slurry in line 37, preferably near the point of withdrawal of said slurry from quench zone 21. The amount of oil introduced at this point is limited to from about two thirds to a quantity equal to the oil absorption value of the carbon contained in the quench water. In this example, the oil absorption value of the carbon is 3 ml./g., and the fuel oil supplied through line 39 is supplied at the rate of about 24 gallons per hundred pounds of carbon, dry basis, contained in the carbon-water slurry withdrawn through line 37. Thorough mixing of the fuel oil with slurry of carbon in water is accomplished by passing the fuel oil and slurry through mixer 41.

In settling tank 38, maintained at substantially the pressure of the gas generator, a curd composed of carbon and oil settles rapidly to the lower portion of the tank whereas clear water accumulates in the upper portion of the settling tank. Clear water is withdrawn from the settling tank through line 42 and passed at a controlled rate by pump 43 into quench section 21 of the synthesis gas generator for reuse. Preferably, a guard filter 44 and baffle 45 are provided in settling tank 38 to facilitate separation and to prevent any of the carbon curds, which contain oil, from entering line 42 for recycle to the quench chamber of the synthesis gas generator. An aqueous suspension of carbon curds, comprising carbon and oil suspended in water, is withdrawn from the lower portion of settling tank 38 at a constant rate by pump 46 and supplied to line 10 as feed to heater 11 as described hereinabove.

In this particular embodiment, the rate of introduction of fresh water to gas scrubber 23 is controlled by valve 47, responsive to liquid level controller 36 associated with quench chamber 21 of the synthesis gas generator. Other methods of control can be devised, but this particular method is a very effective one. By withdrawing clarified recycle quench water and water containing suspended carbon curds from the settling tank 38 at a predetermined controlled rate, the concentration of carbon in the water in quench zone 21 and the concentration of carbon curds in line 10 supplied to heater 11 can be effectively controlled. Fresh water is added to gas scrubber 23 through line 24 as required to make up for losses of water by vaporization into the product gas stream.

Accumulation of heavy, incombustible solid in quench zone 21 may be periodically withdrawn through valve 48 from the lowermost portion of the quench vessel. Preferably, a lock hopper, not illustrated in the drawing, is employed to effect the removal of incombustible solid from the gas quench zone.

The following specific example illustrates the process of this invention.

A synthesis gas generator is operated to produce a gas comprising principally hydrogen and carbon monoxide with no net production of carbon when charging a heavy fuel oil of 13.5° API gravity, a Redwood I viscosity of 3600 at 100° F., and a gross heating value of 18,360 B.t.u.'s per pound. This oil has the following ultimate analysis.

| Component: | Weight percent |
|---|---|
| Carbon | 84.5 |
| Hydrogen | 11.5 |
| Sulfur | 4.0 |

Quench water obtained as described later and comprising 6,956 pounds per hour of water and 705 pounds per hour of carbon curds, is pumped to a tubular heater in which the water is vaporized to steam. The carbon curds, formed as described later, comprise 235 pounds of carbon with 470 pounds of fuel oil absorbed thereon, expressed on an hourly rate basis. Vaporization of water in the tubular heater results in dispersing the carbon and adsorbed fuel oil in steam. Heavy fuel oil at the rate of 13,441 pounds per hour is injected, without preheat, into the steam containing the carbon and oil dispersion and the mixture passed in turbulent flow through a second tubular heater where oil is dispersed in steam and the mixture is preheated to 750° F. The resulting oil-carbon dispersion in steam is introduced into the generator through a burner where it is mixed with oxygen of 95% purity at the rate of 187,268 standard cubic feet per hour. The generator is operated at 400 p.s.i.g. and 2,400° F. to produce 824,825 standard cubic feet per hour of wet synthesis gas containing 235 pounds of carbon.

The hot product gas issuing from the generator is quenched and scrubbed with a sufficient quantity of water to remove substantially all of the carbon from the gas. The resulting product gas has the following analysis, on a dry basis.

| Component: | Weight percent |
|---|---|
| Carbon monoxide | 45.27 |
| Hydrogen | 47.06 |
| Carbon dioxide | 5.26 |
| Methane | 0.25 |
| Nitrogen+argon | 1.25 |
| Hydrogen sulfide+carbonyl sulfide | 0.91 |

A slurry of carbon and water comprising 46,765 pounds per hour of water and the 235 pounds per hour of carbon (a carbon concentration of 0.5 wt. percent) is withdrawn from the quench section of the generator. To this carbon-water slurry is added 470 pounds per hour of the heavy fuel oil feed. This oil is adsorbed by the carbon or combined therewith to form carbon curds which do not tend to stick together and which have a density greater than water and settle to the bottom of a decanter vessel to which the oil-carbon-water mixture is directed. From this decanter 39,809 pounds per hour of clarified water are removed and recycled to the quench vessel. Fresh water is added as needed to provide the above described quenching and carbon scrubbing operations. The underflow from the decanter comprises 705 pounds per hour of carbon curd (consisting of 235 pounds per hour of carbon and 470 pounds per hour of oil) and 6,956 pounds per hour of water. This slurry of curd and water (3.39 wt. percent carbon basis water) is directed to the tubular preheater, previously described, as the source of process water for the generator and a means of disposing of the carbon. Operating in this way there is no net carbon production from the process, the entire product being 824,825 standard cubic feet per hour of wet product gas.

We claim:

1. In a method for generation of synthesis gas by partial oxidation of hydrocarbon which comprises reacting liquid hydrocarbon with oxygen and steam in an unpacked reaction zone at an autogenously maintained temperature in the range of about 2000 to 3500° F. with the production of a minor amount of free carbon not exceeding 5 percent of the total carbon contained in the reactants supplied to the reaction zone producing a hot gas stream comprising carbon monoxide, hydrogen and entrained carbon and contacting said hot gas stream from said reaction zone with water in a gas-liquid contacting zone effecting removal of carbon from said gas stream and forming a slurry of carbon in water, the improvement which comprises returning all of said carbon to said reaction zone by withdrawing said slurry of carbon in water from said gas-liquid contacting zone, introducing heavy fuel oil directly into said slurry in an amount within the range of two-thirds the oil adsorption value of the carbon to an amount equal to the oil absorption value of the carbon sufficient to form carbon curls in water and dispersing said carbon curds in water by thoroughly mixing said added liquid hydrocarbon with said slurry, separating by gravity clarified water from the resulting dispersion, and passing resulting concentrated dispersion of concentrated carbon curds in water into an externally heated tubular heating zone under conditions of turbulent flow wherein water contained in said dispersion is vaporized and carbon contained therein is suspended in resulting steam, and passing the resulting dispersion comprising carbon suspended in steam into said reaction zone into admixture with additional liquid hydrocarbon and oxygen as reactants for the generation of synthesis gas.

2. A process according to claim 1 wherein said portion of said heavy fuel oil added to said slurry is heated to a temperature approximately equal to the temperature of said dispersion of carbon in water prior to contact therewith.

3. In a process for the production of carbon monoxide and hydrogen by partial oxidation of heavy fuel oil wherein said oil is reacted with oxygen and steam is a reaction zone at an autogenously maintained temperature in the range of 2000 to 3500° F. to produce a product gas stream comprising carbon monoxide, hydrogen and a minor amount of entrained solid carbon, the improvement which comprises contacting said product gas stream with water in a gas-liquid contacting zone effecting removal of carbon from said gas stream and forming a slurry of carbon in water, said slurry containing from about 0.5 to about 1 percent carbon by weight; contacting said slurry with a minor portion of said fuel oil in an amount within the range of from about two thirds of oil absorption value to an amount equal to the oil absorption value of the carbon contained in said slurry with sufficient agitation to form a dispersion of carbon curds in water; separating by gravity water substantially free from carbon from the resulting dispersion and thereby increasing the concentration of carbon in the dispersion to three to four percent by weight; passing resulting concentrated dispersion of carbon curds in water to a tubular heating zone under conditions of turbulent flow wherein said water is completely vaporized to steam forming a dispersion comprising carbon in steam; passing resulting mixture through a tubular heating zone at a velocity in excess of 20 feet per second effecting dispersion of said carbon and fuel oil in steam; and passing the resulting dispersion of fuel oil and carbon in steam into said gas generation zone into admixture with oxygen for the production of carbon monoxide and hydrogen therefrom.

References Cited by the Examiner
UNITED STATES PATENTS

| | | | |
|---|---|---|---|
| 2,716,053 | 8/1955 | Mayland | 48—196 |
| 2,867,508 | 1/1959 | Wood et al. | 23—209.4 |
| 2,980,521 | 4/1961 | Dille et al. | 48—196 |
| 2,980,523 | 4/1961 | Dille et al. | 48—215 |
| 3,016,986 | 1/1962 | Dille et al. | 48—196 |

MORRIS O. WOLK, *Primary Examiner.*

MAURICE A. BRINDISI, *Examiner.*